United States Patent [19]

McKinlay

[11] Patent Number: 5,409,338
[45] Date of Patent: Apr. 25, 1995

[54] WEDGE-ACTION LOCK WASHER ASSEMBLY HAVING COUPLED WASHERS

[75] Inventor: Alistair N. McKinlay, Marina Del Rey, Calif.

[73] Assignee: Hong Kong Disc Lock Company, Limited, Hong Kong, Hong Kong

[21] Appl. No.: 229,646

[22] Filed: Apr. 19, 1994

Related U.S. Application Data

[63] Continuation of Ser. No. 57,697, May 4, 1993, abandoned.

[51] Int. Cl.[6] .................. F16B 39/24; F16B 43/00
[52] U.S. Cl. .................. 411/149; 411/161; 411/536
[58] Field of Search ........... 411/134, 136, 146, 147, 411/149, 432, 161, 535, 536

[56] References Cited

U.S. PATENT DOCUMENTS

| | | | |
|---|---|---|---|
| 4,538,313 | 9/1985 | Frieberg | 411/149 X |
| 5,080,545 | 1/1992 | McKinlay | 411/149 |
| 5,090,855 | 2/1992 | Terry | 411/149 X |
| 5,203,656 | 4/1993 | McKinlay | 411/149 |

FOREIGN PATENT DOCUMENTS 60759  7/1954  France ................ 411/149

*Primary Examiner*—Neill R. Wilson
*Attorney, Agent, or Firm*—Charles W. Chandler

[57] ABSTRACT

A wedge-action lock washer assembly in which a pair of washers have cam surfaces disposed in a face-to-face relationship. A sleeve-like keeper is permanently disposed in the central opening of the two washers and has a pair of annular lips engaging the two washers to permit the two washers to move with respect to one another but preventing their separation from the keeper.

8 Claims, 2 Drawing Sheets

WEDGE-ACTION LOCK WASHER ASSEMBLY HAVING COUPLED WASHERS

This application is a continuation of application Ser. No. 08/057,697, filed May 4, 1993, now abandoned.

BACKGROUND OF THE INVENTION

Wedge-action lock washers are useful because they tend to become tighter under vibration. Examples of such wedge-action locking devices are disclosed in U.S. Pat. No. 3,263,727 which was issued Aug. 2, 1966 to Arthur B. Herpolsheimer; U.S. Pat. No. 3,417,802 which was issued Dec. 24, 1968 to Carl O. Oldenkott; and U.S. Pat. No. 5,080,505 which was issued Jan. 14, 1992 to Allstair N. McKinlay.

Identically-shaped washers are supplied to the user in individual components which he then must install with the cam faces in a face-to-face relationship. Should one or both of the washers be reversed, the device will not function when a bolt is tightened on the workpiece. It loses its self-locking function.

U.S. Pat. No. 4,538,313 which was issued Sep. 3, 1985 to Bent O. Frieberg suggested one solution to the accidental or careless reversal of the washer faces in the form of bonding material, such as a glue or an adhesive applied to the two washers to keep them coupled until such time as a rotational force is applied during the tightening of a fastening device.

SUMMARY OF THE INVENTION

The broad purpose of the present invention is to provide an improved wedge-action, lock washer assembly in which the two washers are permanently coupled together, permitting the cam faces to be rotated with respect to one another but preventing the two washers from being separated from their cam face to cam face relationship.

The preferred embodiment of the invention comprises a pair of lock washers each having a cam face and an opposed friction face. The cam face is conventional; the friction face may have small radially extending ribs, a knurled surface, or the like, or for some applications a flat surface.

The friction surface on each washer has a groove around its central opening. A keeper or sleeve is disposed in the central opening of the two washers. The sleeve has a central opening for slidably receiving the shank of a fastener such as a bolt. A pair of annular lips are carried at opposite ends of the sleeve. Each lip is slidably received in the groove of an associated washer. The length of the sleeve permits the cam faces on the two washers to be rotated with respect to one another. The lips are disposed within the profile of the friction faces of the two washers.

The keeper retains the two washers in their assembled position until they are used as a fastener. The keeper prevents the user from mismatching the washer surfaces. The preferred washer assembly is quicker to install because the user does not have to consider whether they are properly assembled. Further, the washers may be reused without losing their coupled construction. This is an advantage over washers using only a temporary bonding agent which loses its effectiveness after the washers have been installed as a fastener.

Still further objects and advantages of the invention will become readily apparent to those skilled in the art to which the invention pertains upon reference to the following detailed description.

BRIEF DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
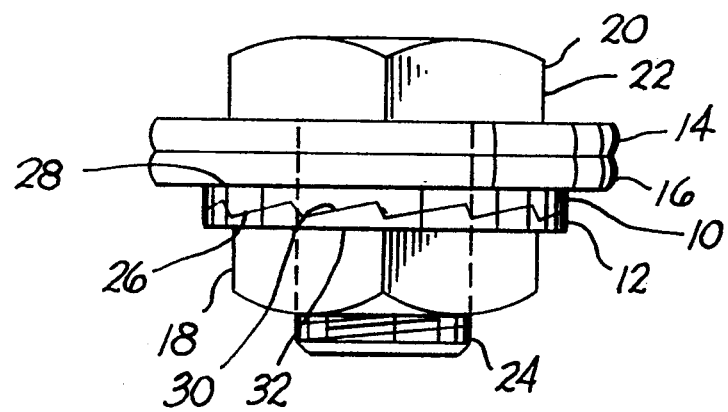
FIG. 1 is an elevational view of a fastener assembly having a wedge-action lock washer assembly illustrating the preferred embodiment of the invention.
Figure 2:
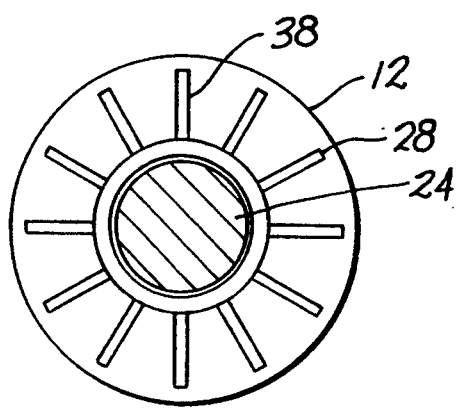
FIG. 2 is a view of the friction face of the washer assembly of FIG. 1.

FIGS. 1 and 2 illustrate a lock washer assembly embodying features of the invention. The lock washer assembly comprises two identical lock washers 10 and 12, generally flat or planar, disposed between a pair of sheet-like workpieces 14 and 16, and an internally threaded fastener nut 18. Fastener bolt 20 has a head 22 seated against workpiece 14. Threaded shank 24 extends through openings in workplaces 14 and 16 and is meshed with internal threads in nut 18.

Lock washer 10 has a substantially flat, planar cam surface 26 and a substantially flat, planar friction surface 28. Similarly, lock washer 12 has a cam surface 30 and a friction surface 32.

Figure 6:
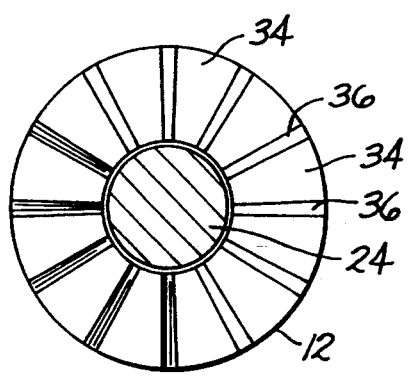
FIG. 6 is a view showing the typical cam surface of one of the washers.

FIG. 6 illustrates a typical cam surface of an individual washer. Each cam face has 12 circumferentially spaced cam surfaces illustrated in FIG. 6. The cam surfaces are interconnected by shoulder surfaces 36. Although the preferred embodiment is illustrated with 12 cam surfaces, other multiples can also be employed such as 14 cam surfaces. The cam surface extends at an acute angle with respect to the plane of the washer. A preferred cam surface angle is approximately 10 degrees, as viewed in FIG. 1. Each shoulder surface is angled to the plane of flat surface 28 at approximately 60 degree although this angle is not critical. The angle of each cam surface is somewhat critical since it has to be greater than the pitch angle (or lead angle) of the threads on bolt shank 24.

The friction face on the two washers is preferrably identical. For illustrative purposes the friction surface of washer 10 is illustrated in FIG. 2 and has a substantially flat surface 28 interrupted by 12 radially extending ribs 38, circumferentially spaced about the surface of the friction surface.

Figure 3:
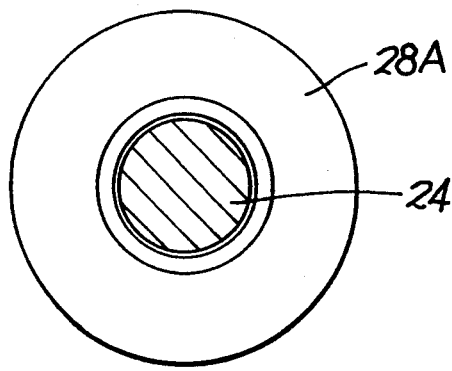
FIG. 3 is a view similar to FIG. 2 but showing a friction face that is flat, devoid of any projections.

FIG. 3 illustrates another embodiment in which friction surface 28A is flat without being interrupted by any ribs. Such a surface is appropriate for certain materials as is more fully described in my U.S. Pat. No. 5,080,545.

Figure 4:
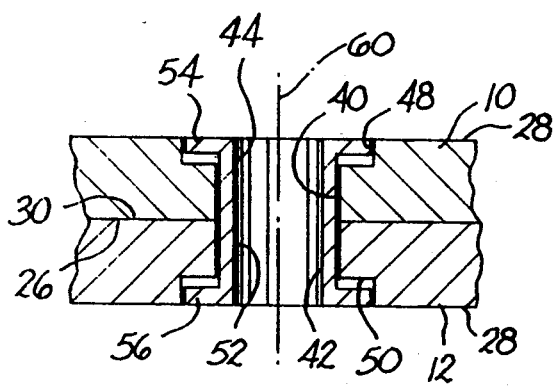
FIG. 4 is an enlarged sectional view showing the keeper with the two washers in face-to-face contact.
Figure 5:
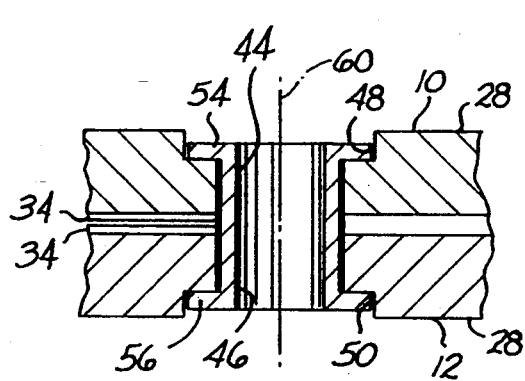
FIG. 5 is an enlarged view similar to FIG. 4, but showing the two washers separated so that the cam surfaces can be rotated with respect to one.

FIGS. 4 and 5 is an enlarged fragmentary view of the central portion of the lock washers removed from the bolt. Lock washer 10 has a circular central opening 40. Lock washer 12 has an identical central opening 42. A sleeve-shaped keeper 44 is mounted in openings 40 and 42. Keeper 44 has a central opening 46 for slidably receiving the bolt, and is slidably engaged with central openings 40 and 42 of the two lock washers. Washer 10 has an annular groove 48 while washer 12 has an annular groove 50 disposed about its central opening.

The keeper has a cylindrical midsection 52 and a pair of annular lips 54 and 56 slidably disposed in grooves 48 and 50. The lips extend outwardly from the cylindrical midsection and are slidably mounted in their respective grooves.

The two washers are moveable between one extreme position, illustrated in FIG. 4, in which cam surfaces 26 and 30 are in surface-to-surface contact. The depth of the grooves is greater than the axial thickness of the lips measured in a direction parallel to axis 60. Axis 60 also represents the direction in which a tightening force is applied to the washers when the fastener is being tightened on the workpiece.

The extreme position of the two washers and the keeper illustrated in FIG. 4 shows that the outer surfaces of the lips do not extend beyond the friction surfaces of the two washers.

FIG. 5 illustrates the other extreme position of the two washers in which they are separated. In this position, cam surface 26 on washer 10 clears the cam surface 30 on washer 12. Thus the two washers can be rotated 360 degrees with respect to one another. In this position, the lips are bottomed in grooves 48 and 50 in such a manner that the lips do not extend beyond the friction surfaces of the two washers.

Thus the keeper maintains the two washers at all times in a position in which the cams are disposed in a face-to-face relationship. The user can quickly install the washer assembly with the fasteners without worrying about the relative positions of the two washers. He cannot install them with mis-matched washer faces. Similarly, the washer assembly can be reused when the fastener is disassembled since the keeper maintains the washers permanently disposed in their operative relationship.

Having described my invention, I claim:

1. A wedge-action lock washer assembly adapted for disposition between a flat workpiece surface and an opposed flat surface on a threaded fastener element, comprising:
   a pair of similarly shaped annular non-elastic washer bodies each having a first substantially planar annular surface and a second substantially planar annular surface, each of said washer bodies having a central opening therein;
   cam means formed on the first planar surface of each of the pair of washer bodies, said cam means comprising a plurality of cam structures arranged around the central opening;
   each of said washer bodies having an annular groove bounding the central opening thereof;
   an annular keeper having a cylindrical midsection with a central opening for receiving the shank of a fastener, and a first open end and a second open end, the keeper being disposed in the central openings of the pair of washer bodies;
   first annular lip means on the first end of the cylindrical midsection extending radially outwardly from the cylindrical midsection for slidably engaging the annular groove of a first of the pair of washer bodies, and a second lip means on the second end of the cylindrical midsection extending radially outwardly from the cylindrical midsection for slidably engaging the annular groove of the second of the pair of washer bodies, the keeper having an overall thickness less than the combined thickness of the pair of washer bodies, whereby the keeper prevents the washer bodies from being removed from a position in which the cam means on the first washer body face the cam means on the second washer body and the keeper is rotatable with respect to the pair of washer bodies when a fastener element disposed in the keeper is fully fastened on a workpiece.

2. A wedge-action lock washer assembly as defined in claim 1, in which the second planar annular surface is flat and devoid of projections.

3. A wedge-action lock-washer assembly as defined in claim 1, including friction means disposed on the second generally flat planer surface of each washer.

4. A wedge-action lock washer assembly as defined in claim 3, in which the friction means comprises a first radially extending rib disposed on the second flat planar surface of each washer body.

5. A wedge-action lock washer assembly as defined in claim 1, in which the distance between the first and the second lip means permit the first and the second washer bodies to be separated a distance sufficient to permit the cam structure on one of the pair of washer bodies to be rotated freely with respect to the cam structure on the second of the pair of washer bodies a distance of 360 degrees.

6. A wedge-action lock washer assembly as defined in claim 1, in which the pair of washer bodies are moveably axially with respect to one another on the keeper between first and second extreme positions, and the outer surfaces of the lip means are disposed within the plane of the second flat planer surfaces of the pair of washer bodies when the washer bodies are in either of said extreme positions.

7. A wedge-action lock washer assembly as defined in claim 1, wherein each of the pair of washer bodies may be rotated about the keeper 360 degrees with respect to the other of the pair of washer bodies without being removed from the keeper.

8. A wedge-action lock washer assembly adapted for disposition between a workpiece surface and an opposed surface on a threaded fastener element, comprising:
   a pair of similarly-shaped, non-elastic annular washer bodies including a first washer body and a second washer body, each having an outer substantially planar annular surface and an inner annular surface, each of said washer bodies having a central opening therein;
   an inclined cam surface carried on each of the inner annular surfaces, the inclined cam surface on the first washer body being disposed in surface-to-surface contact with the inclined cam surface on the second washer body such that when the washer bodies are rotated, one with respect to the other, the pair of washer bodies move to a wedged position between a workpiece surface and a fastener element;
   an annular keeper having a cylindrical midsection with a central opening for receiving the shank of a fastener, and a first open end and a second open end, the keeper having an overall axial thickness, and being disposed in the central openings of the pair of washer bodies;
   first lip means carried on the first open end of the cylindrical midsection of the keeper extending radially outwardly from the cylindrical midsection for slidably engaging the first washer body, and a second lip means carried on the second end of the cylindrical midsection extending radially outwardly from the cylindrical midsection for slidably engaging the second washer body, the combined thickness of the pair of washer bodies, when the inclined cam surfaces are in surface-to-surface contact, being greater than the overall axial thickness of the keeper, whereby the keeper prevents the washers from being removed from a position in which the cam surface on the first washer body faces the cam surface on the second washer body.

* * * * *